United States Patent [19]
Jones

[11] Patent Number: 6,059,397
[45] Date of Patent: May 9, 2000

[54] IMAGE DEPOSITION METHOD

[75] Inventor: Michael E. Jones, Portland, Oreg.

[73] Assignee: Xerox Corporation, Stamford, Conn.

[21] Appl. No.: 09/285,284

[22] Filed: Apr. 2, 1999

Related U.S. Application Data

[62] Division of application No. 08/757,366, Nov. 27, 1996, Pat. No. 5,949,452.

[51] Int. Cl.⁷ .............................. B41J 2/145; B41J 2/15; B41J 2/21; B41J 29/38
[52] U.S. Cl. ................................. 347/41; 347/43; 347/12
[58] Field of Search ..................... 347/41, 43, 12

[56] References Cited

U.S. PATENT DOCUMENTS

| | | | |
|---|---|---|---|
| 4,232,324 | 11/1980 | Tsao | 347/41 |
| 4,272,771 | 6/1981 | Furukawa | 347/12 |
| 4,855,752 | 8/1989 | Bergstedt | 347/41 |
| 5,059,984 | 10/1991 | Moore et al. | 347/41 |
| 5,300,957 | 4/1994 | Burke | 347/41 |
| 5,389,958 | 2/1995 | Bui et al. | 347/103 |
| 5,488,396 | 1/1996 | Burke et al. | 347/37 |
| 5,625,390 | 4/1997 | Burke et al. | 347/41 |
| 5,734,393 | 3/1998 | Eriksen | 347/41 |

*Primary Examiner*—N. Le
*Assistant Examiner*—Thinh Nguyen
*Attorney, Agent, or Firm*—Charles F. Moore; Francis I. Gray

[57] ABSTRACT

A method for depositing an image on a receiving surface utilizing two scans of a print head is provided. Each scan deposits a portion of the image, and the two scans are separated by a non-deposition skip move. The two image portions are joined at a seam to create a composite image. By utilizing identical print head motions along the x-axis direction for all images, this method allows for accurate and repeatable image-half alignment regardless of image width, length or position on the receiving surface.

16 Claims, 7 Drawing Sheets

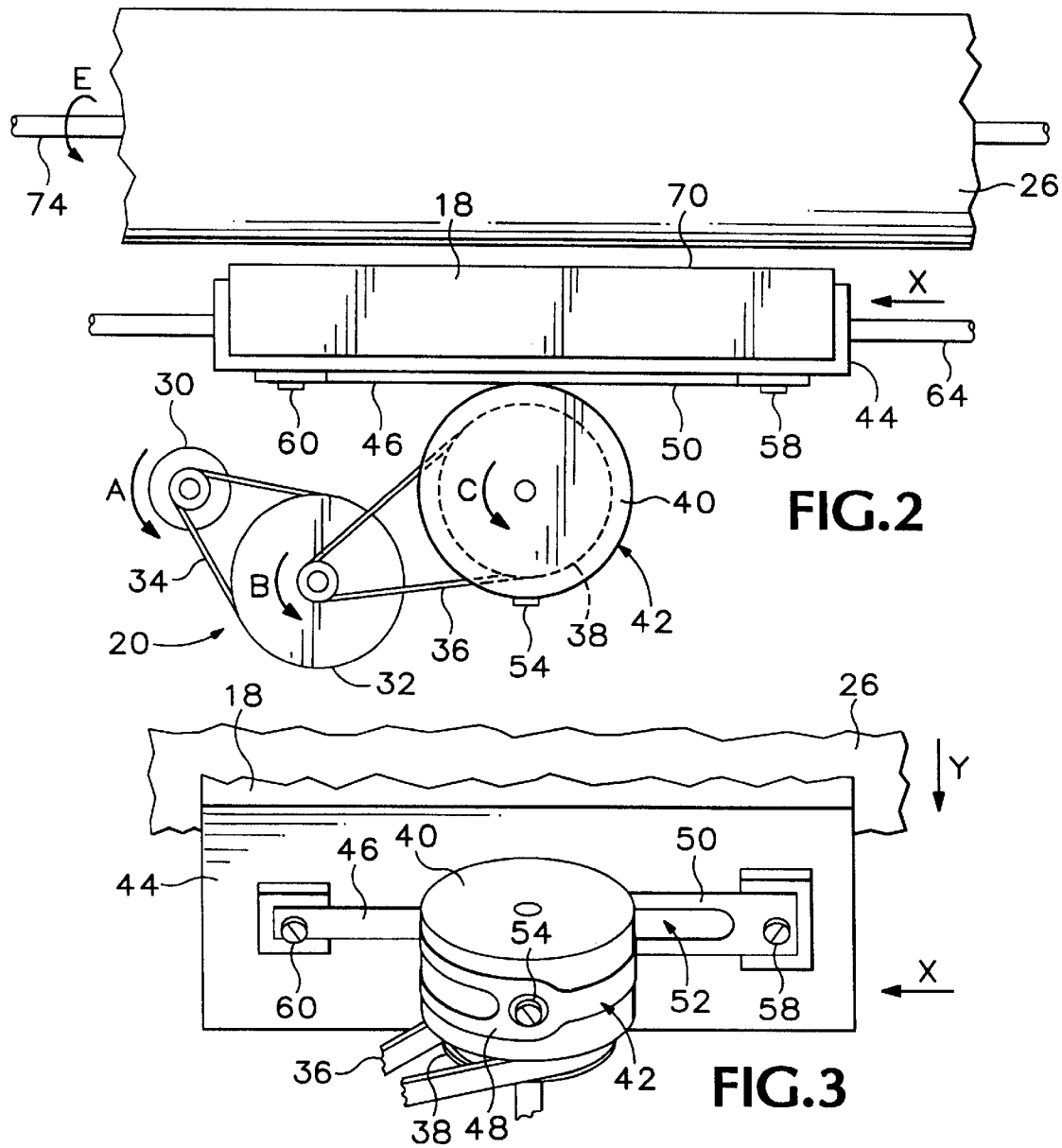
FIG.2
FIG.3
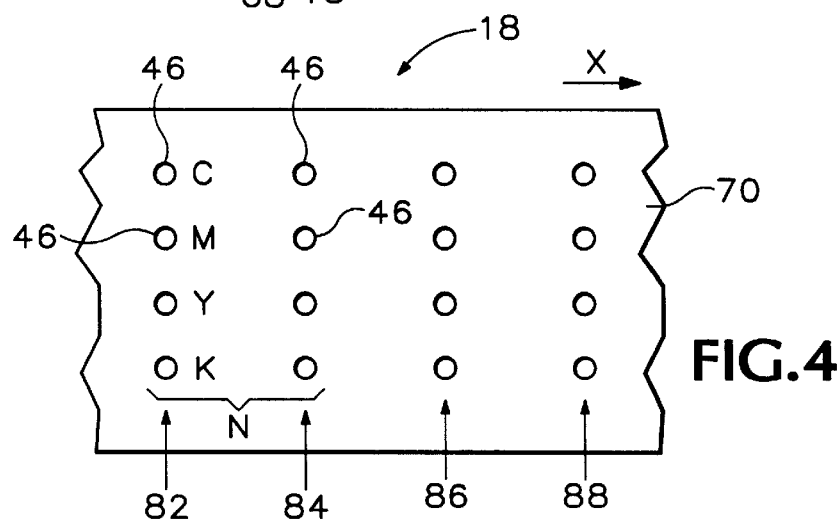
FIG.4

IMAGE DEPOSITION METHOD

This application is a divisional of U.S. patent application Ser. No. 08/757,366, filed Nov. 27, 1996, now U.S. Pat. No. 5,949,452 issued Sep. 7, 1999.

TECHNICAL FIELD

The present invention relates generally to ink jet printers and, more particularly, to a method for printing a composite image comprising two image portions that are interleaved at a seam.

BACKGROUND OF THE INVENTION

Ink-jet printing systems commonly utilize either direct printing or offset printing architecture. In a typical direct printing system, ink is ejected from jets in the print head directly onto the final receiving medium. In an offset printing system, the print head jets the ink onto an intermediate transfer surface, such as a liquid layer on a drum. The final receiving medium is then brought into contact with the intermediate transfer surface and the ink image is transferred and fused or fixed to the medium.

In some direct and offset printing systems, the print head moves relative to the final receiving medium or the intermediate transfer surface in two dimensions as the print head jets are fired. Typically, the print head is translated alone an X-axis while the final receiving medium/intermediate transfer surface is moved along a Y-axis. In this manner, the print head "scans" over the print medium and forms a dot-matrix image by selectively depositing ink drops at specific locations on the medium.

With reference now to the image deposition process in an offset printing architecture, the print head moves in an X-axis direction that is parallel to the intermediate transfer surface as the drum supporting the surface is rotated. Typically, the print head includes multiple jets configured in a linear array to print a set of scan lines on the intermediate transfer surface with each drum rotation. Precise placement of the scan lines is necessary to meet image resolution requirements and to avoid producing undesired printing artifacts, such as banding and streaking. Accordingly, the X-axis (head translation) and Y-axis (drum rotation) motions must be carefully coordinated with the firing of the jets to insure proper scan line placement.

As the size of the desired image increases, the X-axis movement/head translation and/or Y-axis motion requirements become greater. One technique for printing larger-format images is disclosed in U.S. Pat. No. 5,734,393 for INTERLEAVED INTERLACED IMAGING, assigned to the assignee of the present patent. This application discloses a method for interleaving or stitching together multiple image portions to form a larger composite image. Each of the image portions is deposited with a separate X-axis translation of the print head. After the deposition of each image portion, the print head is moved without firing the jets to the start position for the next image portion. Adjacent image portions overlap and are interleaved at a seam to form the composite image.

In this image deposition method, the relative position of each image portion must be carefully controlled to avoid visible artifacts at the seam joining adjacent image portions. With specific regard to the X-axis movement of the print head, it is necessary to precisely deposit each image portion such that adjacent image portions are aligned to properly interleave at the seam. Furthermore, the X-axis movement must be capable of repeatably producing composite images having different sizes and positions on the print medium without creating a visible artifact at the seam between adjacent image portions. Thus, an accurate X-axis positioning mechanism and corresponding positioning method are required.

Prior art ink jet printers have utilized various mechanisms to impart X-axis movement to a print head. An exemplary patent directed to an X-axis positioning mechanism is U.S. Pat. No. 5,488,396 for PRINTER PRINT HEAD POSITIONING APPARATUS AND METHOD (the '396 patent), assigned to the assignee of the present application. This patent discloses a motion mechanism comprising a stepper motor that is coupled by a metal band to a lever arm. Rotation of the lever arm imparts lateral X-axis notion to a positioning shaft that is attached to the print head. This mechanism translates each step of the stepper motor into one pixel of lateral X-axis movement of the print head. The amount of X-axis translation per step of the stepper motor is adjustable by an eccentrically mounted ball that is positionable on the lever arm.

While the positioning mechanism of the '396 patent provides highly accurate and repeatable positioning of a print head, it is nevertheless subject to minor displacement errors arising from such factors as imbalances in stepper motor phase and thermal expansion of various components under changing operating temperatures. Additionally, variations in horizontal jet spacing on the print head can create uncertainty as to the actual X-axis position of a jet, and thus uncertainty in the placement of certain scan lines. Furthermore, when the above described method for printing an interleaved composite image is used, these types of displacement errors are magnified at the seam joining the two image portions. Even very slight deviations in scan line placement on the order of 0.0003 inches (0.0076 mm), normally imperceptible within a fully interlaced image, generate a visible artifact due to misalignment at the seam.

Accordingly, the present invention is directed to a print head positioning method that substantially eliminates displacement errors arising from mechanical variations in a print head positioning mechanism.

SUMMARY OF THE INVENTION

It is an aspect of the present invention to provide an image deposition method for printing composite images composed of image portions interleaved at a seam, the method providing accurate and repeatable alignment of the image portions along the seam.

It is another aspect of the present invention to provide an image deposition method in which the print head undergoes identical motions along the X-axis for all images, regardless of size or position on the receiving surface.

It is a feature of the present invention that the same jets on the print head are used to print the seam for all images, regardless of size.

It is another feature of the present invention that the size and position of the image are controlled by selectively firing and ignoring jets on the print head.

It is an advantage of the present invention that print artifacts arising from inaccuracies in an X-axis drive mechanism and/or uncertainties in jet position on a print head are effectively minimized.

To achieve the foregoing and other aspects, features and advantages, and in accordance with the purposes of the present invention as described herein, an improved image deposition method for an ink jet printer is provided. The image deposition method utilizes identical movements of the print head along the X-axis to accurately deposit image portions that overlap at a seam and form an overall composite image. The same jets on the print head are used to print the seam in all images, regardless of size. By moving the print head identical distances along the X-axis for all images, the method of the present invention substantially eliminates visible artifacts at the seam due to uncertainties in print head displacement along the X-axis.

Still other aspects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modifications in various, obvious aspects all without departing from the invention. Accordingly, the drawings and descriptions will be regarded as illustrative in nature and not as restrictive. And now for a brief description of the drawings.

BRIEF DESCRIPTION OF THE DRAWINGS

FIG. 2 is a top pictorial view showing the operative relationships among a stepper motor, first and second pulleys, first and second belts, capstan, split band and print head carriage, these components comprising an X-axis drive mechanism. This figure also illustrates how the print head is mounted on the print head carriage to move along the X-axis parallel to the transfer drum.

FIG. 3 is a front isometric view showing how the split band couples the capstan to the print head carriage.

FIG. 4 is an enlarged elevational view of a portion of the print head face showing parallel vertical columns of ink jets, each column having from top to bottom a cyan, magenta, yellow and black ink jet.

DETAILED DESCRIPTION OF THE PREFERRED EMBODIMENT

Figure 1:
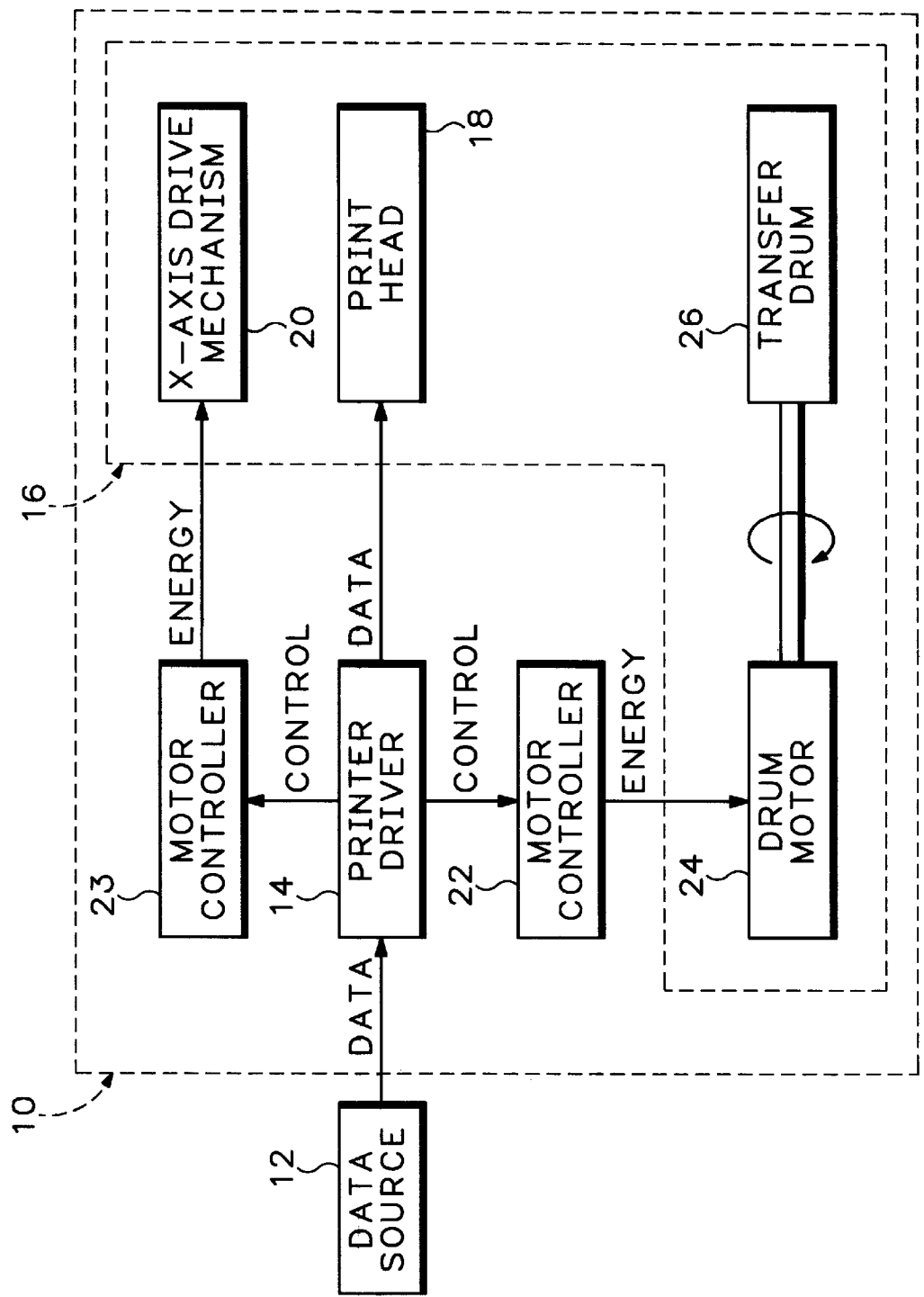
FIG. 1 is a simplified block diagram of an offset ink-jet printing apparatus that utilizes the image deposition method of the present invention.

FIG. 1 is a schematic illustration of an offset ink-jet printing apparatus 10 that utilizes the image deposition method of the present invention. An example of this type of offset printer is disclosed in U.S. Pat. No. 5,389,958 (the '958 patent) entitled IMAGING PROCESS and assigned to the assignee of the present application. The '958 patent is hereby specifically incorporated by reference in pertinent part. The following description of a preferred embodiment of the method of the present invention refers to its use in this type of printing apparatus. It will be appreciated, however, that the method of the present invention may be used with various other ink-jet printing apparatus that utilize different architectures, such as direct printing apparatus in which ink is jetted directly onto a receiving medium. Accordingly, the following description will be regarded as merely illustrative of one embodiment of the present invention.

With continued reference to FIG. 1, the printing apparatus 10 receives imaging data from a data source 12. A printer driver 14 within the printer 10 processes the imaging data and controls the operation of print engine 16. The printer driver 14 feeds formatted imaging data to a print head 18 and controls the movement of the print head by sending control data to a motor controller 23 that activates an X-axis drive mechanism 20. The driver 14 also controls the rotation of the transfer drum 26 by providing control data to a motor controller 22 that activates the drum motor 24.

With reference now to FIG. 2, in operation the print head 18 is moved parallel to the transfer drum 26 along an X-axis as the drum 26 is rotated and the print head jets (not shown) are fired. As shown in FIG. 3, rotation of the drum 26 creates motion in a Y-axis direction relative to the print head 18, as indicated by the action arrow Y. In this manner, an ink image is deposited on an intermediate transfer layer (not shown) that is supported by the outer surface of the drum 26. A more detailed explanation of an exemplary ink image deposition procedure utilizing line interlacing is provided below. When the image is fully deposited on the intermediate transfer layer, a final receiving medium, such as a sheet of paper or a transparency, is brought into contact with the transfer drum 26, and the deposited image is simultaneously transferred and fixed (transfixed) to the medium.

FIGS. 2 and 3 illustrate a preferred embodiment of the X-axis drive mechanism 20. A stepper motor 30 is coupled to a first pulley 32 by a first belt 34. The preferred stepper motor 30 is a bipolar, microstep driven motor having a displacement of 1.8 degrees per step. The first pulley 32 is coupled by a second belt 36 to a second pulley 38. As best seen in FIG. 3, a capstan 40 is coaxially mounted with the second pulley 38. A split band 42 couples the capstan 40 to a print head carriage 44. Preferably, the capstan 40 is made from a material having a coefficient of thermal expansion of $1.62 \times 10^{-6}/°C$. or less. In this manner, the size of the capstan 40 remains substantially unchanged over a range of operating temperatures to facilitate a nearly constant relationship between rotation of the stepper motor 30 and translation of the print head carriage 44.

As shown in FIG. 3, the band 42 has an elongated shape that includes a first arm 46, a center portion 48 and a second arm 50 that includes a slot 52 through which the first arm 46 can freely pass. Preferably, the band is punched from stainless steel and has a thickness of 0.008 inches (0.203 mm). The band 42 is firmly attached to the capstan 40 by a fastener 54. The second arm 50 wraps about one-half turn around the capstan 40, extends along the print head carriage 44 and is fastened to the carriage by a fastener 58. Similarly, the first arm 46 wraps about one-half turn around the capstan 40, extends through the slot 52 and along the print head carriage 44 and is affixed to the carriage by a fastener 60.

With reference now to FIG. 2, the print head 18 is mounted on the print head carriage 44. The print head carriage 44 is slideably mounted on a shaft 64 for movement in the X-axis direction, as indicated by the action arrow X. In operation, the stepper motor 30 is moved in the direction of action arrow A, which rotates the first pulley 32 in the direction of action arrow B. Second pulley 38 and capstan 40 are thereby rotated in the direction of action arrow C, which translates the print head carriage 44 and the attached print head 18 in the X-axis direction. In the preferred embodiment, this two-stage reduction drive mechanism 20 translates each 1.8 degree step of the stepper motor 30 into one-half pixel of movement in the X-axis direction at the print head carriage 44. Thus, two steps of the motor 30 are required for one pixel of X-axis movement. It will be appreciated by those skilled in the art that other mechanisms for translating the print head 18 in the X-axis direction may be utilized with the method of the present invention as described below.

Figure 6:
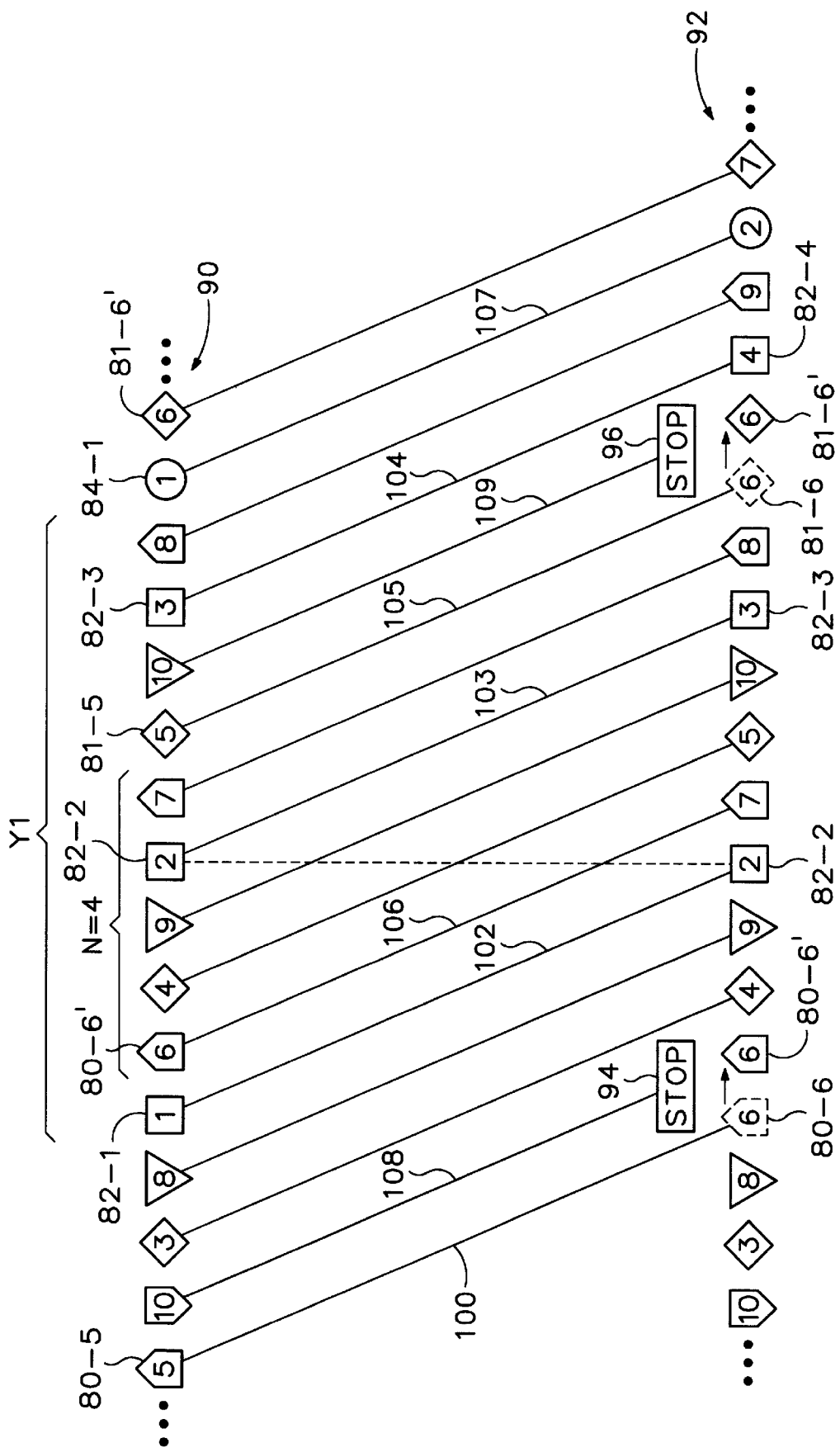
FIG. 6 is a schematic representation of a portion of the scan lines that are printed by the ink jet columns of FIG. 5.

With continued reference to FIG. 2, the print head 18 includes a face 70 that extends parallel to the transfer drum 26. The drum 26 rotates about a shaft 74 in the direction of action arrow E. As the drum rotates and the print head 18 moves along the X-axis, a plurality of ink jets (not shown) on the face 70 eject ink onto the intermediate transfer layer (not shown) on the drum 26. As illustrated in FIG. 6 and explained in more detail below, one rotation of the transfer drum 26 and a simultaneous translation of the print head 18 along the X-axis while firing the ink jets 46 results in the deposition of a diagonal scan line, such as scan line 102, on the intermediate transfer layer of the drum 26. It will be appreciated that one scan line has a width of one pixel (one pixel width). In 300 dots per inch (dpi) (118 dots per cm.) printing, one pixel has a width of 0.00333 inches (0.085 mm). Thus, the width of one 300 dpi scan line equals 0.00333 inches.

FIG. 4 illustrates a portion of the face 70 of the print head 18 as viewed from the intermediate transfer layer of the drum 26. Parallel vertical columns comprising four ink jets 46 each are located across the face 70. While only four columns 82, 84, 86 and 88 are shown, it will be appreciated that the preferred print head 18 utilizes at least 88 columns of ink jets 46. Each column of jets 46 includes from top to bottom a cyan C, magenta M, yellow Y and black K ink jet 46. In this manner, individual ink droplets from a single column of ink jets 46 may overlay each other during a scan of the print head 18 to produce a desired color. In the preferred embodiment of print head 18, the black ink jet K in each column of jets 46 is offset two pixels to the left, as viewed in FIG. 4, from the other three ink jets Y, M and C above.

In the preferred embodiment of the method of the present invention, described in more detail below, a line interlacing technique is used to create an ink image on the transfer drum 26. Line interlacing entails printing adjacent scan lines with two or more different columns of ink jets 46. For example, without reference to an illustration, in a three to one (3:1) interlace, scan lines 1, 4, 7, etc. are printed with a first column of jets, lines 2, 5, 8, etc. are printed with a second column of jets and lines 3, 6, 9, etc. are printed with a third column of jets. A discussion of line interlacing is presented in the '393 patent referenced above. The '393 patent is hereby incorporated by reference in pertinent part. The preferred embodiment of the method of the present invention utilizes 300 dpi printing. It will be appreciated that the method of the present invention may also be practiced with other printing resolutions, such as 600 dpi.

With continued reference to FIG. 4, adjacent columns of ink jets 46 are spaced apart along the X-axis by an interjet spacing of N pixel widths. The interjet spacing N determines the number of adjacent scan lines that must be printed to produce a solid fill image. As a single scan line corresponds to one rotation of the transfer drum 26 and a simultaneous movement or step of the print head 18 along the X-axis, the interjet spacing N also dictates the number of rotations of the drum that must occur to create a solid fill image. It follows that a print head 18 having an interjet spacing of N=10 requires 10 rotations of the transfer drum to produce a solid fill image. It will be appreciated that the size of a solid fill image is dependent upon the size of the print head and the line interlacing ratio that is utilized.

As explained above, a scan line is printed by rotating the transfer drum 26 while simultaneously moving the print head 18 in the X-axis direction and firing the ink jets 46. To create the above-described 3:1 interlace, the print head 18 moves or steps a distance n of three pixels in the X-axis direction for every rotation of the transfer drum. In practice, the X-axis drive mechanism 20 moves the print head 18 at a constant velocity while the transfer drum 26 rotates. Thus, an alternative representation of a 3:1 interlace pattern is the numeric step sequence through which the print head 18 travels to print a solid fill image. For a print head 18 having an interjet spacing N=10 and using a 3:1 interlace, the X-axis step sequence of the print head is 3, 3, 3, 3, 3, 3, 3, 3, 3, 3.

Figure 5:
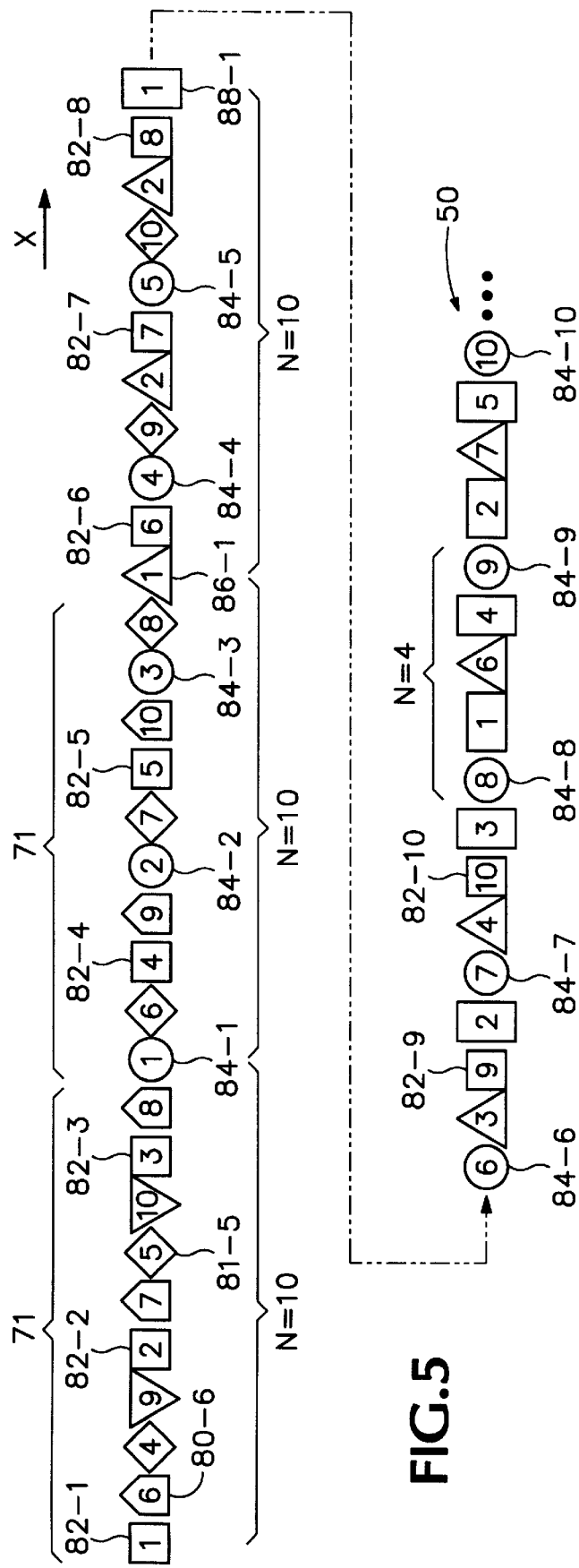
FIG. 5 is a schematic representation of line interlacing with a 4:1 interlace ratio and a print head having an interjet spacing N of 10 pixels, this figure illustrating the X-axis position of several adjacent ink jet columns as viewed from the transfer drum during the printing of a solid fill image.

FIGS. 5 and 6 schematically illustrate an example of the line interlacing produced by a print head 18 having an interjet spacing N=10 and an image deposition procedure that utilizes a 4:1 interlace ratio (n=4). FIG. 5 is a "time-lapse" illustration of the X-axis position of several ink jet columns as viewed from the drum 26 during the printing of a solid fill image. Alternatively expressed, FIG. 5 is a schematic representation of a portion of a solid fill image showing the position of the ink jets 46 prior to each of the ten rotations of the drum 26. Each of the adjacent symbols in the row 50 represents one column of jets 46 on the print head 18 as viewed from the drum 26. All of the symbols having the same shape and orientation represent the same column of jets 46 of FIG. 4. For purposes of understanding, it may be easier for the reader to visualize each symbol as a single ink jet 46 corresponding to a particular jet column that is positioned at the beginning of a rotation of the drum 26. The number within each symbol designates a particular rotation of the transfer drum 26, with 1 being the first rotation and 10 being the last rotation among the 10 rotations required to print a solid fill image. It follows that symbols 82-1, 84-1, 86-1 and 88-1 represent the X-axis position of jet columns 82, 84, 86 and 88, respectively, at the beginning of the first rotation of the drum 26.

Symbols 82-1 through 82-10 represent the position of jet column 82 at the beginning of the first through the tenth rotations of the drum 26, respectively. Similarly, symbols 84-1 through 84-10 represent the position of jet column 84 at the beginning of the first through the tenth rotations of the drum 26, respectively. This illustrates that for an interlace of 4:1, the print head 18 moves a distance of n=4 pixels along the X-axis with each rotation of the drum 26. From FIG. 4 it will be noted that jet column 82 is adjacent to jet column 84. It follows that in FIG. 5 the distance between symbol 82-1 and symbol 84-1 is equal to the interjet distance or spacing of N=10 pixels. FIG. 5 also illustrates that a 4:1 interlaced image is comprised of bands 71 that contain output from four different jet columns. Each of the bands 71 has a width equal to the interjet spacing N=10.

FIG. 6 illustrates a portion of the scan lines that are printed by the jet columns represented by the symbols in FIG. 5. Scan lines 102, 103 and 104 are each printed by jet column 82 on consecutive rotations of the drum 26. More specifically, scan line 102 is printed on the first rotation, scan line 103 is printed on the second rotation and scan line 104 is printed on the third rotation. Each symbol along the upper row 90 represents the position of a particular jet column at the beginning of a scan line, i.e., the beginning of a rotation of the drum 26. This position also corresponds to the end of the previous scan line printed by this jet column on the previous rotation of the drum 26, as indicated by the same symbol with the same rotation number on the lower row 92. Alternatively expressed, each symbol along the lower row 92 represents the position of a particular jet column at the end of a scan line. For example, symbol 82-2, corresponding to jet column 82, is simultaneously positioned at the end of scan line 102 (on the lower row 92) and the beginning of scan line 103 (on the upper row 90). The one exception to this positioning occurs at the beginning of the first rotation of the drum 26, as represented by symbols 82-1 and 84-1. As this is the first rotation of the drum 26, there are no previous scan lines that have been printed. Thus, symbols 82-1 and 84-1 represent only the beginning of scan lines 102 and 107, respectively, and these symbols do not have a counterpart on row 92.

With continued reference to FIG. 6, the print head step pattern for the illustrated 4:1 interlace is 4, 4, 4, 4, 5, 4, 4, 4, 4, 4. All of the steps cover the same distance along the X-axis of 4 pixels per drum revolution except for the 5th step, which is one greater than the others. This extra pixel of movement on the fifth rotation of the drum 26 is termed an adjustment move for the purposes of this application. The adjustment move is illustrated in the printing of scan lines 100 and 105. For example, at the end of the printing of scan line 100, jet column 80 is positioned at the beginning of scan line 102, this position being indicated in phantom by the symbol 80-6 in the lower row 92. However, scan line 102 was printed by jet column 82 on the first rotation of the drum 26. Thus, were printing to continue with jet column 80 in this position, the scan line printed by jet column 80 would overlap scan line 102 upon the next drum rotation, and the interlace would have a gap of one scan line.

To avoid this problem, the print head 18 of FIG. 2 is advanced one extra pixel (the adjustment move) at the end of the fifth rotation of the drum 26. In this manner, jet column 80 is properly positioned adjacent to the beginning of scan line 102, this position being indicated by the symbol 80-6'. This adjustment move must occur when the jets are not printing on the drum 26. In the preferred embodiment, the surface area of the drum 26 is larger than the largest image to be printed on the drum 26. This allows the drum 26 to include a dead band portion over which the print head jets do not fire. The adjustment move occurs within this dead band portion of the drum 26.

With continued reference to FIG. 6, at the end of ten rotations of the drum 26, the interlaced image is complete and printing stops. This is indicated by the symbols 94 and 96 at the end of scan lines 108 and 109, respectively.

The above example of a 4:1 interlace utilized a print head 18 having an interjet spacing N of 10. This relatively small value of N was intentionally chosen to facilitate the schematic illustration of the interlace pattern. In the preferred embodiment of the present invention, the print head 18 utilizes an interjet spacing N of 28 with a 4:1 interlace. The corresponding step sequence of the preferred print head 18 is 4, 4, 4, 4, 4, 4, 6, 4, 4, 4, 4, 4, 4, 5.35, 4, 4, 4, 4, 4, 4, 6, 4, 4, 4, 4, 4, 4, 4. An adjustment move occurs at the end of the 7th, 14th and 21st rotation of the drum 26. The middle adjustment move at the 14th rotation is given a non-integer value of 1.35 pixels to utilize scan line pairing to further improve image quality. Scan line pairing alters the middle adjustment move in an interlace pattern to a value slightly different from an integer scan line distance. In this manner, all subsequently printed scan lines will not be equidistant from both of their adjacent scan lines, but rather moved closer or "paired" with one of their adjacent scan lines. Scan line pairing of interlaced images is addressed in more detail in U.S. Pat. No. 5,625,390 entitled "PAIRING OF INK DROPS ON A PRINT MEDIUM" (the '390 patent). The '390 patent is hereby incorporated in pertinent part.

Figure 7:
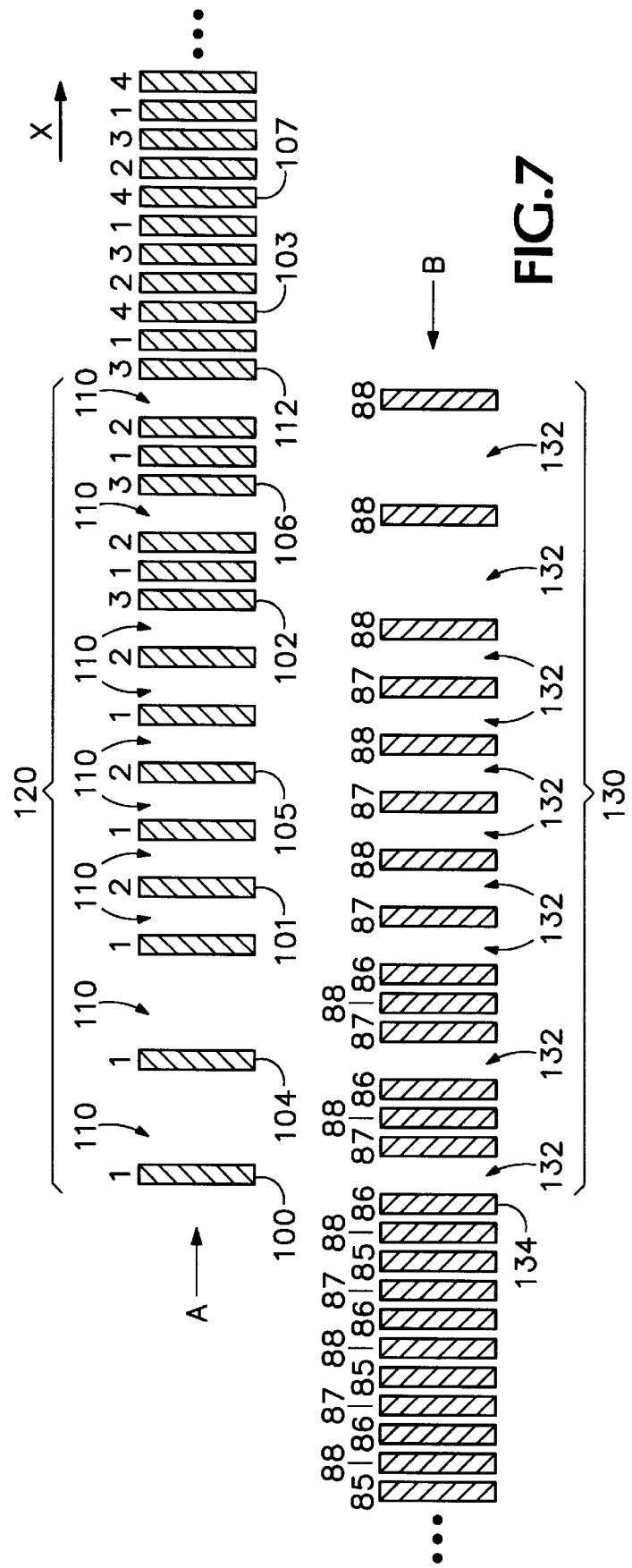
FIG. 7 is an illustration of the scan lines printed at the extreme left and right edges of an interlaced image where the print head has an interjet spacing of 10 pixels and the interlace ratio is 4:1.

Care must be taken when printing the edges of an interlaced image when the interlace ratio is greater than 2:1. FIG. 7 illustrates the results of printing using all of the jet columns on print head 28. Row A is the extreme left edge of an interlaced image and row B is the extreme right edge of an interlaced image where the interjet distance N is 10 and the interlace ratio is 4:1. It will be appreciated that rows A and B are actually printed along the same horizontal axis, and FIG. 7 shows A and B vertically separated for illustration purposes only. Each rectangle in rows A and B represents a scan line of the image, with the numbers above the rectangles representing the particular jet column that prints that scan line. As drawn, scan lines with a "1" are the printed by the leftmost or first jet column, scan lines with a "2" are printed by the second jet column, and so forth. Similarly, scan lines with an "88" are printed by the rightmost or last jet column, scan lines with an "87" are printed by the next adjacent jet column, and so forth.

With reference to row A, the scan lines 100, 101, 102, and 103 are printed during the first rotation of the drum 26, the scan lines 104, 105, 106, and 107 are printed during the second rotation, and so forth. It will be appreciated that the majority of the interlaced image extends to the right of the scan lines illustrated in row A. As this figure illustrates, the resulting, interlaced image has gaps 110 and is not fully filled until scan line 112. The print region containing gaps 110 at the beginning of printing is termed a "head" 120 for the purpose of explanation in this application. Gaps 110 in head 120 would normally be considered to be unacceptable in a printed image. To avoid the gaps, the leftmost edge of the interlaced image may be mapped to scan line 112 such that no scan lines to the left of scan line 112 are printed.

Referring now to row B, a corresponding situation occurs at the other end of print head 18, resulting in a "tail" 130. To avoid gaps 132 in tail 130, the rightmost edge of the interlaced image may be mapped to scan line 134 such that no scan lines to the right of scan line 134 are printed.

Figure 8:
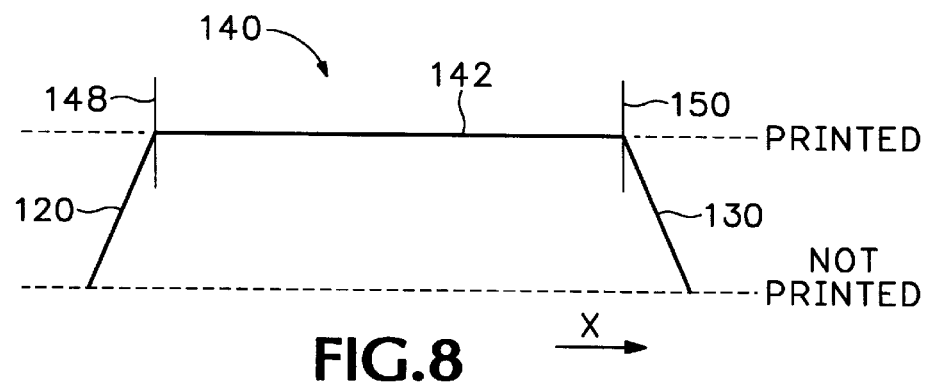
FIG. 8 is a simplified illustration of an interlaced image having a head and a tail.

FIG. 8 illustrates a simplified view of an interlaced image 140 along the X-axis, showing the fully filled region 142. The head 120 and tail 130 are simply represented as ramps. By confining the output of print head 28 to between scan lines 148 and 150, the gaps can be avoided and only the fully filled region 142 will be printed.

Figure 9:
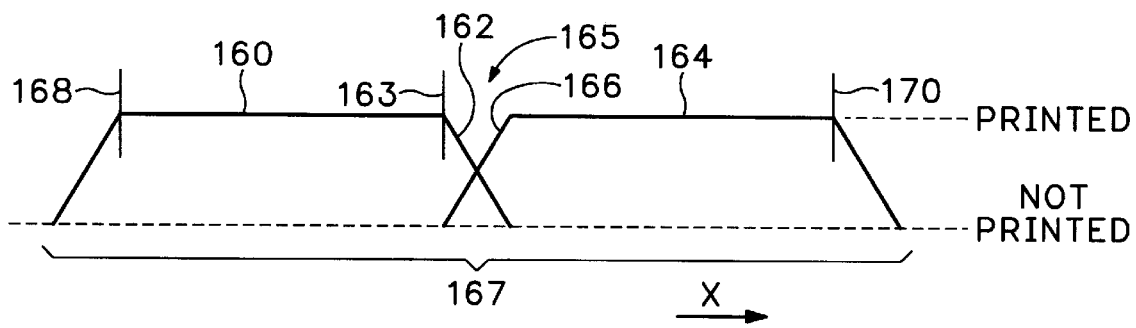
FIG. 9 is a simplified illustration of interleaving two image portions at a seam by aligning the tail of one image portion with the head of the other image portion to form a composite image.

Alternatively, with reference back to FIG. 7, it can be seen that the gaps 110 of the head 120 are perfectly aligned with the printed scan lines in the tail 130. It follows that a composite interlaced image may be interleaved or "stitched" together from two image portions by aligning their respective tail 130 and head 120. FIG. 9 shows a simplified representation of interleaving two image portions at a seam 165 to result in a wider composite interlaced image 167. Printing a composite interlaced image 167 substantially wider than print head 18 can be achieved by printing a first image portion 160 having a tail 162, moving print head 18 to the beginning 163 of the tail 162, and then printing a second image portion 164 having a head 166 that interleaves with tail 162. In the present application, printing the first image portion 160 and tail 162 is referred to as "Scan 1", moving the print head 18 to the beginning 163 of the tail 162 is referred to as the "skip move" and printing the head 166 and the second image portion 164 is referred to as "Scan 2."

The resulting composite image 167 can be mapped between a first scan line 168 in the first image portion 160 and a second scan line 170 in the second image portion 164. The composite image 167 need not be the full width available between the first and second scan lines 168 and 170, respectively. Alternatively expressed, the jet columns on the print head 18 that print the extreme left and right edges of the image 167 are not required to be adjacent to one end of the print head. Thus, if the width of the desired composite interlaced image 167 is less than twice the maximum width of a single image portion printable by print head 18, then less than all of the jet columns will be used to print the first and second image portions 160 and 164, respectively. Furthermore, it will be recognized that a composite interlaced image can comprise more than two image portions.

From the above description of interlacing a first and second image portion 160, 164, it will be appreciated that the relative position of each image portion along the X-axis must be carefully controlled to insure proper alignment at the seam 165. It is also desirable to vary the width of one or both image portions 160, 164 to allow for printing composite images 167 having variable widths.

One method for varying the width of the composite image alone the X-axis is to vary the distance of the skip move between the end of Scan 1 and the beginning of Scan 2. However, varying the distance of the skip move requires varying the jet columns that print the head 162 and tail 166 that comprise the seam 165. As mentioned above, even very slight inaccuracies in X-axis displacement will result in noticeable artifacts at the seam 165. Thus, if there is even 0.0003 inch uncertainty in the displacement of the print head 18 along the X-axis, varying the ink jets that print the seam 165 will result in a visible artifact at the seam.

To avoid artifacts at the seam produced by X-axis uncertainties, the method of the present invention utilizes identical motions of the print head 18 along the X-axis, including an identical skip distance, for all composite images of various widths. Alternatively expressed, the beginning and ending positions of the print head 18 along the X-axis for Scan 1 and Scan 2 are identical for all images. The width of the composite image is controlled by changing the jets 46 that print the extreme left and right scan lines 168, 170 of the image 167 (FIG. 9). As explained in more detail below, this method allows the same jets to print the seam 165 in all images, thereby avoiding uncertainties in the X-axis position of the print head 18 at the seam 165.

Figure 10:
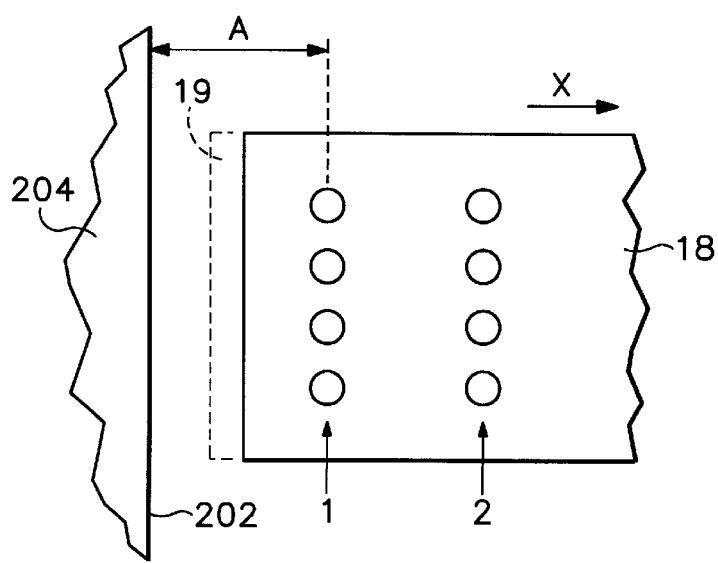
FIG. 10 is a partial elevational view of the face of the print head showing the leftmost column of ink jets being positioned a distance A from the inside face of the left side frame of the printer, this position being the point at which printing begins in the method of the present invention.

With reference now to FIG. 10, the method of the present invention begins with positioning the print head 18 a distance A from a fixed reference point. In the preferred embodiment, the fixed reference point is the inside face 202 of the left side frame 204 of the printer 10 as viewed from the drum 26. The distance A is preferably 1.98 inches (5.03 cm) as measured from the centerline of the leftmost jet column 1.

Figure 11:
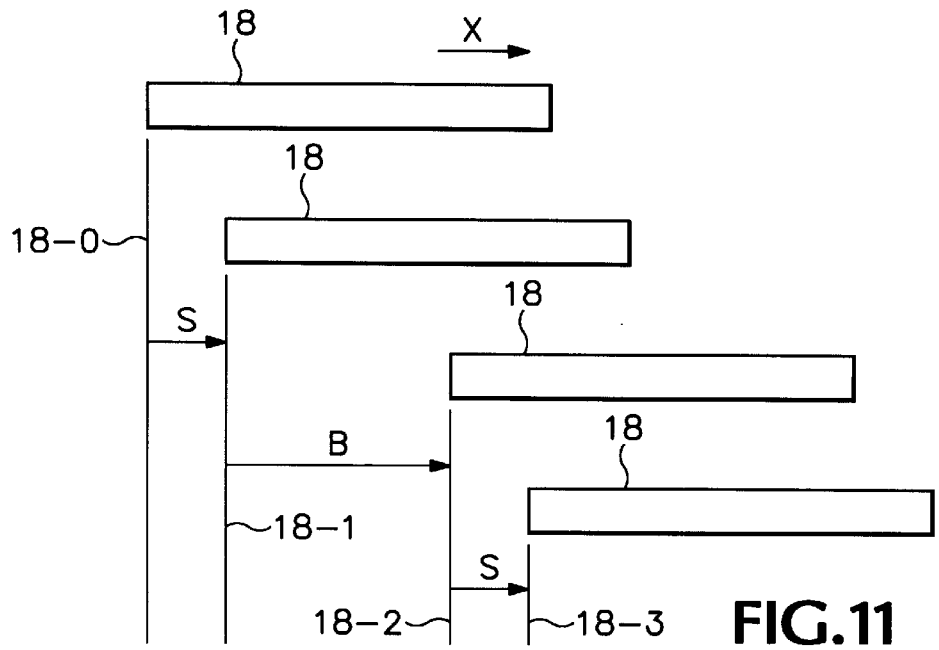
FIG. 11 is a schematic representation showing the movement of the print head along the X-axis during successive scans according to the method of the present invention.

From this position the print head 18 is moved a short distance toward the left side frame 204 of the printer 10, as indicated by the phantom outline of the left end 19 of the print head in FIG. 10. In the preferred embodiment this distance is 8 pixels. This allows the X-axis drive mechanism 20 to accelerate the print head 18 to a constant velocity before Scan 1 begins printing at the desired distance A from the reference point. FIG. 11 schematically illustrates the position of the print head 18 along the X-axis at the beginning of Scan 1 (18-0), end of Scan 1 (18-1), beginning of Scan 2 (18-2) and end of Scan 2 (18-3). As mentioned above, the preferred image deposition method utilizes a 4:1 interlace and an interjet spacing N of 28. Accordingly, to complete Scan 1 the drum 26 will make 28 revolutions and the print head will advance along the X-axis according to the step pattern of 4, 4, 4, 4, 4, 4, 6, 4, 4, 4, 4, 4, 4, 5.35, 4, 4, 4, 4, 4, 4, 6, 4, 4, 4, 4, 4, 4, 4. Thus, in 300 dpi printing, the total distance S travelled by the print head 18 along the X-axis to complete Scan 1 is 117.35 pixels, where one 300 dpi pixel=0.0333 inches (0.8466 mm).

At the end of Scan 1, the print head 18 prints the tail 162 of the first image portion 160 (FIG. 9). As explained above, the preferred print head 18 utilizes 88 columns of ink jets 46, the columns being numbered 1–88 from left to right as viewed from the drum 26 (see FIG. 10). In the preferred embodiment of the method of the present invention, jet columns 72–74 are utilized to print the tail 162 of the first image portion 160. It follows that jet columns 75–88 are not used to print during Scan 1. As mentioned above, in an important aspect of the present invention, the same jet columns 72–74 are used to print the tail 162 of the first image portion 160 in all composite images 167, regardless of width. The width of the composite image 167 is controlled strictly by selective jet addressing.

Upon the completion of Scan 1 and the tail 162, the print head 18 executes a skip move and advances to the beginning 163 of the tail 162, which is also the beginning of the head 166 (FIG. 9). This position corresponds to the beginning of Scan 2, as indicated by the reference numeral 18-2 in FIG. 11. The skip move is coordinated with the rotation of the drum 26 to occur over an integral number of drum revolutions, and the ink jets are not fired during the skip move. The distance B travelled by the print head 18 during the skip move is fixed for all composite images, regardless of width. The formmula for calculating the skip distance B is as follows: B=NW-{[(H-1)+1-(n-1)]N+S}, where N=interjet spacing; W=maximum solid fill imaging distance along the X-axis that is addressable by the print head, expressed as the number of jet columns spanning this distance; H=number of jet columns on the print head; n=distance advanced by print head with each drum rotation, and S=distance advanced by print head to print the first image portion. In the preferred embodiment, B=1394.65 pixels in 300 dpi printing, or 4.644 inches (11.81 cm).

Scan 2 begins with the printing of the head 166 of the second image portion 164. As explained above, the head 166 interleaves with the tail 162 to form the seam 165 that joins the first and second image portions 160, 164 (FIG. 9). In the preferred embodiment, jet columns 18–20 of the print head 18 are utilized to print the head 166 of the second image portion 164. It follows that jet columns 1–17 are not used for printing during Scan 2. As with Scan 1, these same jet columns 18–20 are used to print the head 166 of the second image portion 164 in all composite images, regardless of width. Additionally, Scan 2 advances the print head 18 the same distance S along the X-axis, 117.35 pixels, and utilizes the same step pattern as Scan 1. At the completion of Scan 2, the complete composite image 167 is formed. It will be appreciated that the method of the present invention contemplates printing and combining more than two image portions to form a composite image.

Figure 12:
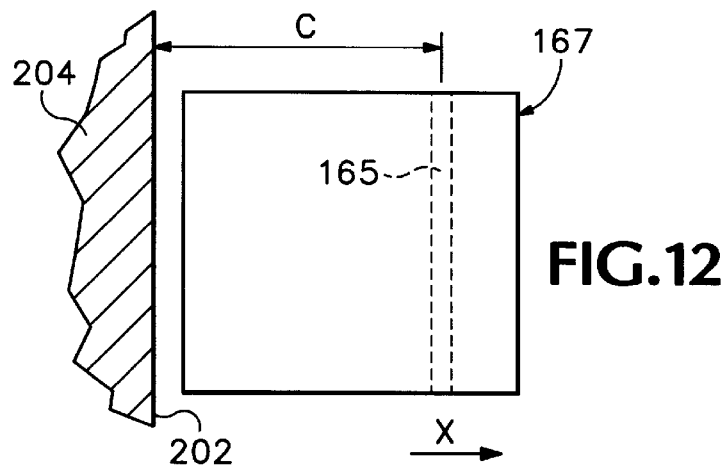
FIG. 12 is an illustration of the position along the X-axis of the seam in a first composite image.
Figure 13:
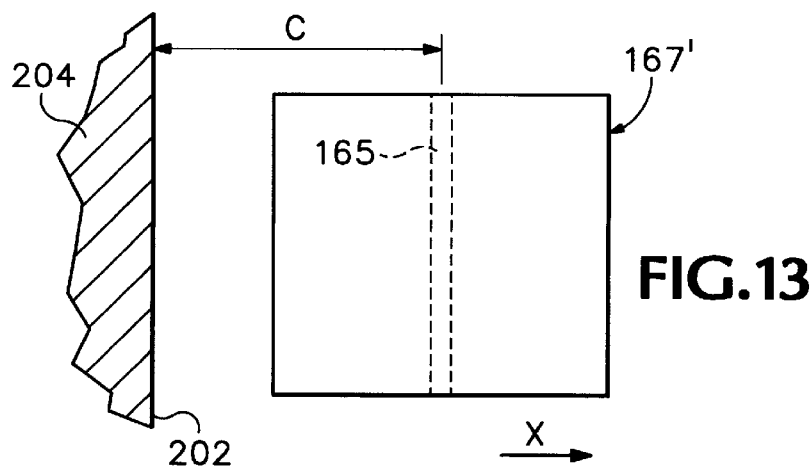
FIG. 13 is an illustration of the X-axis position of the seam in a second composite image having a different width than the first composite image of FIG. 12, the seam in FIG. 13 being located the same distance C along the X-axis from the inside face of the printer frame as the seam in FIG. 12.

To summarize an important aspect of the present invention, the print head 18 undergoes identical movements along the X-axis to print all images, regardless of image width, length or position on the receiving surface. More specifically, with respect to a fixed reference point on the printer frame, the position of the print head at the beginning of Scan 1 and the distance travelled by the print head in executing Scan 1, the skip move and Scan 2 are all the same for every image printed. The width, length and position of a particular composite image are controlled by selectively firing the ink jets 46 on the print head 18. Alternatively expressed, the width, length and position of an image are controlled by varying the ink jets 46 that print the left and right edges of the image 167, as represented by the scan lines 168 and 170 in FIG. 9. The method of the present invention advantageously allows the same ink jets 46 to print the seam 165 joining the first and second image portions 160, 164 in all composite images. It also follows that the position of the seam 165 along the X-axis relative to the fixed reference point is fixed for all images, regardless of their width, length or position on the media. As shown in FIGS. 12 and 13, the seam 165 is positioned the same distance C along the X-axis from the fixed reference point represented by the inside face 202 of the left side frame 204 of the printer 10. The difference in the placement of the seam 165 within the image 167 versus the placement of the seam 165 within the image 167' results from variations in media position on the drum 26 and variations in image size and position on the media.

As explained above, even very slight inaccuracies in X-axis displacement will result in noticeable artifacts at the seam 165. Accordingly, the step pattern followed by the print head 18 along the X-axis during Scans 1 and 2 along with the skip move must be precisely controlled by the X-axis drive mechanism 20. In an ideal X-axis drive mechanism 20, rotational commands to the stepper motor 30 would correspond linearly to translation of the print head along the X-axis (FIG. 2). However, in practice, several factors related to the components of the X-axis drive mechanism 20 cause X-axis displacement errors. These factors include imbalances in phases of the stepper motor 30, eccentricities in the first and second pulleys 32, 38 and the capstan 40 and imperfect tooth engagement between the belts 34, 36 and the pulleys.

To compensate for inaccuracies in the X-axis drive mechanism 20 of a particular printer 10, the velocity of the print head along the X-axis is adjusted by a calibration factor to coordinate print head displacement with drum rotation. Alternatively expressed, for a given X-axis drive mechanism 20, the velocity of the print head 18 along the X-axis during Scan 1 is adjusted by a first calibration factor to achieve the desired print head step pattern. In a similar manner, the velocity of the print head 18 along the X-axis during Scan 2 is adjusted by a second calibration factor, and the velocity of the print head 18 during the skip move is adjusted by a skip calibration factor. In the preferred embodiment, each calibration factor is determined empirically by analyzing the deviation between the X-axis displacement commanded by the printer driver 14 (FIG. 1) and the actual X-axis displacement. In this manner, the actual print head displacement along the X-axis is calibrated to match the required displacements of the method of the present invention.

The foregoing description of a preferred embodiment of the invention has been presented for purposes of illustration and description. It is not intended to be exhaustive or to limit the invention to the precise form disclosed. The terms and expressions which have been employed in the foregoing specification are used therein as terms of description and not of limitation. The use of such terms and expressions is not intended to exclude equivalents of the features shown and described or portions thereof. Many changes, modifications, and variations in the materials and arrangement of parts can be made, and the invention may be utilized with various different printing apparatus, all without departing from the inventive concepts disclosed herein.

The preferred embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally, and equitably entitled. All patents cited herein are incorporated by reference in their entirety.

What is claimed is:

1. In an ink-jet printer having a print head and a receiving surface that undergo relative movement, the print head including a plurality of jets for ejecting ink, the plurality of jets being spaced apart by a distance N along an X-axis, a method for printing multiple composite images having different widths, each of the composite images having at least two image portions interleaved at a seam, the method comprising the steps of:

(a) positioning the print head a distance A along the X-axis from a fixed reference point;

(b) printing a set of scan lines of a first image portion by moving the print head relative to the receiving surface a distance n along the X-axis while ejecting ink from at least a portion of the plurality of jets;

(c) repeating step (b) until the first image portion having a tail is completed;

(d) moving the print head relative to the receiving surface along the X-axis a fixed skip distance B;

(e) printing a set of scan lines of a second image portion by moving the print head relative to the receiving surface a distance n along the X-axis while ejecting ink from a portion of the plurality of jets;

(f) repeating step (e) until a second image portion having a head is completed, where the tail of the first image portion interleaves with the head of the second image portion to form the seam and to complete at least a portion of a first composite image having a width;

(g) repeating steps (a) through (f) to print a second composite image having a different width than that of the first composite image, where movement of the print head relative to the receiving surface along the X-axis is identical for printing the first composite image and the second composite image.

2. The method of claim 1, wherein a width of the first composite image and a width of the second composite image are controlled by selectively firing the plurality of jets of the print head.

3. The method of claim 1, wherein the same jets of the print head are used to print the seam in the first composite image and the second composite image.

4. The method of claim 1, wherein the seam is spaced from the reference point by the same distance in the first composite image and the second composite image.

5. The method of claim 1, wherein a velocity of the print head along the X-axis is adjusted by a first calibration factor while printing the first image portion.

6. The method of claim 1, wherein a velocity of the print head along the X-axis is adjusted by a second calibration factor while printing the second image portion.

7. The method of claim 1, wherein the fixed skip distance B is defined by the formula $B=NW-\{[(H-1)+1-(n-1)]N+S\}$, where $N=$a distance between jets along the X-axis; $W=$a width along the X-axis of a maximum solid fill image that is addressable by the print head; $H=$a total number of the plurality of jets; $n=$a distance advanced by the print head with each drum rotation; and $S=$a distance advanced by the print head to print the first image portion.

8. The method of claim 1, wherein the fixed skip distance B is 1394.65 pixel widths in 300 dpi printing.

9. The method of claim 1, wherein the fixed skip distance B is adjusted by a skip calibration factor.

10. The method of claim 1, wherein step (c) comprises repeating step (b) N−1 times to complete the first image portion having a tail.

11. The method of claim 10, wherein step (f) comprises repeating step (e) N−1 times to complete the second image portion having a head.

12. The method of claim 1, wherein no ink is ejected from the plurality of jets during step (d).

13. A method for printing multiple composite images in an ink-jet printer, each of the composite images having at least two image portions interleaved at a seam, the ink-jet printer having a print head and a receiving surface that undergo relative movement, the print head including a plurality of jets for ejecting ink, the plurality of jets being arranged at least along an X-axis, the method comprising the steps of:

(a) printing a first image portion having a tail by moving the print head relative to the receiving surface along the X-axis while ejecting ink from at least a portion of the plurality of jets;

(b) moving the print head relative to the receiving surface along the X-axis a fixed skip distance B;

(c) printing a second image portion having a head by moving the print head relative to the receiving surface along the X-axis while ejecting ink from at least a portion of the plurality of jets, where the tail of the first image portion interleaves with the head of the second image portion to form the seam and to complete at least a portion of a first composite image;

(d) repeating steps (a) through (c) to print at least a portion of a second composite image, where movement of the print head relative to the receiving surface along the X-axis is identical for printing the first composite image and the second composite image.

14. The method of claim 13, wherein the first composite image and the second composite image have an approximately identical width.

15. The method of claim 13, wherein the first composite image and the second composite image have different widths.

16. The method of claim 13, wherein the first composite image and the second composite image are positioned differently on the receiving surface.

* * * * *